United States Patent [19]
Bella

[11] Patent Number: 6,137,880
[45] Date of Patent: *Oct. 24, 2000

[54] PASSIVE SPLITTER FILTER FOR DIGITAL SUBSCRIBER LINE VOICE COMMUNICATION FOR COMPLEX IMPEDANCE TERMINATIONS

[75] Inventor: Gregory L. Bella, Naperville, Ill.

[73] Assignee: Westell Technologies, Inc., Aurora, Ill.

[ * ] Notice: This patent is subject to a terminal disclaimer.

[21] Appl. No.: 09/384,441

[22] Filed: Aug. 27, 1999

[51] Int. Cl.[7] .......................... H04M 1/00; H04M 11/00
[52] U.S. Cl. .............................................. 379/399
[58] Field of Search .................... 379/398–400, 379/402, 213, 215, 93.05, 93.09

[56] References Cited

U.S. PATENT DOCUMENTS

| | | | |
|---|---|---|---|
| 5,329,588 | 7/1994 | Willocx et al. | 379/413 |
| 5,339,019 | 8/1994 | Benz | 323/286 |
| 5,343,520 | 8/1994 | Willocx et al. | 379/399 |
| 5,577,161 | 11/1996 | Pelaez Ferrigno | 395/2.35 |
| 5,623,543 | 4/1997 | Cook | 379/402 |
| 5,625,318 | 4/1997 | Sevenhans et al. | 327/563 |
| 5,627,501 | 5/1997 | Biran et al. | 333/17.1 |
| 5,680,393 | 10/1997 | Bourmeyster et al. | 370/286 |
| 5,848,150 | 12/1998 | Bingel | 379/399 |
| 5,889,856 | 3/1999 | O'Toole et al. | 379/399 |

OTHER PUBLICATIONS

IEEE Journal On Selected Areas In Communications, vol. 13, No. 9, *ADSL and VADSL Splitter Design and Telephony Performance*, Jim Cook and Phil Sheppard, Dec. 1995.

*Primary Examiner*—Wing F. Chan
*Attorney, Agent, or Firm*—Pennie & Edmonds LLP

[57] ABSTRACT

A dual-mode filter network for an Asymmetric Digital Subscriber Line (ADSL) has a first frequency response when the Plain Old Telephone Service (POTS) telephone is on-hook and has a second frequency response when the POTS telephone is off-hook. A detector is used to determine the on-hook/off-hook status. The dual-mode filter network may be situated at the central unit and connected to a Public Switched Telephone Network (PSTN) while the detector at the remote unit connected between the POTS low pass filter and the POTS telephone. In such case, the detector outputs a signal which is transmitter via the twisted pair on an overhead channel. Alternatively, the dual-mode filter and the detector may be co-located at either the central unit or at the remote unit. Regardless of where it, or the detector are located, the dual-mode filter network has at least different combinations of components which are activated, depending on the on-hook/off-hook status of the POTS phone. In addition, a single-mode filter instead of the dual-mode filter can be used at the remote unit.

20 Claims, 9 Drawing Sheets

PASSIVE SPLITTER FILTER FOR DIGITAL SUBSCRIBER LINE VOICE COMMUNICATION FOR COMPLEX IMPEDANCE TERMINATIONS

RELATED APPLICATIONS

This application is related to U.S. application Ser. No. 09/038,938 filed Mar. 12, 1998 and U.S. application Ser. No. 09/083,162 filed May 22, 1998.

TECHNICAL FIELD

This invention concerns technology which facilitates simultaneous data and voice traffic over a communication channel. More particularly, it relates to devices arranged to filter voice signals sent across standard twisted pair telephone lines.

BACKGROUND OF THE INVENTION

Asymmetric Digital Subscriber Line (ADSL) is a technology which allows for simultaneous voice and data traffic to coexist over a communication channel comprising a standard telephone transmission line. Typically, the standard telephone transmission lines comprise an unshielded twisted pair of copper wire having a gauge of 22–26AWG. Twisted pairs, which can be used to connect a central telephone system (a 'central' unit) to a subscribers telephone (a 'remote' unit) can support bandwidths of up to 2 MHz through the use of digital signal processing (DSP) technology. Thus, they can be used for bandwidth-intensive applications, such as internet access and video-on demand, as well as for carrying voice traffic. Frequency division multiplexing is used so that a plurality of signals, each occupying a different frequency band, can be simultaneously sent over the same transmission line.

The voice traffic band comprises a number of frequency sub-bands, or channels, ranging from DC to 20 KHz. The analog voiceband frequency is typically specified as 200–4000 Hz. Customer specified additions may include phone operation up to 8 KHz and 12–16 KHz billing tones. In addition, DC to 30 Hz frequencies are typically assigned for auxiliary analog signaling purposes, such as ringing the telephone, dial pulsing and on/off hook signaling.

ADSL data traffic bandwidth for CAP (carrierless amplitude and phase) modulation is typically from 35 KHz–1.5 MHz. Of this, upstream data traffic (i.e., remote unit to central unit) uses the 35 KHz–191 KHz band, while the downstream traffic (i.e., central unit to remote unit) uses the 240 KHz–1.5 MHz band. The bandwidth for DMT (discrete multi-tone modulation) starts at 25 KHz.

As both data traffic and voice traffic are sent over the same physical channel, the differing types of signal traffic being received over the transmission line must be distinguished from one another at both the remote unit and the central unit. In addition, voice and data signals to be transmitted over the transmission line must be properly combined at each end. In prior art systems, Plain Old Telephone Service (POTS) separation filters, installed at both the remote unit and at the central unit are used for this purpose.

FIG. 1 shows the typical arrangement of an existing system for handling voice and data traffic over a physical channel comprising a transmission line 100 comprising a twisted pair of wires 104, 106. The existing systems must operate when the phone 118 is either on-hook (POTS signals may include ringing signals and/or on-hook transmissions such as caller-ID) or off-hook (POTS signals may include tone dialing, pulse dialing and voice).

At the remote end 110, the transmission line is connected to a remote's high pass filter (HPF) 112 and a remote's low pass filter (LPF) 114, the filters 112, 114 being arranged in parallel. The output of the remote HPF 112 is then sent to a remote ADSL transceiver 116 which connects to additional data links in a known manner. The output of the remote LPF 114 connects to a telephone 118 or answering machine, or like, in a known manner.

At the central unit 120, the transmission line 100 is connected to a central unit high pass filter (HPF) 122 and a central unit low pass filter (LPF) 124, the filters 122, 124 again being arranged in parallel. The output of the central unit HPF 122 is presented to the central unit ADSL transceiver 126, from which it can connect to additional data links in a known manner. The output of the central unit LPF 124 is presented to a public switched telephone network (PSTN) 128 for connection to other subscribers at other remote systems, long distance services, and the like.

The filters 112, 114, 122 and 124 must meet certain performance criteria. In the ADSL frequency range, the LPF 114, 124 input impedance must be high enough not to load down the transceiver input, which generally has a resistance of 100 Ω. On the other hand, in the voiceband frequency range, the HPFs 112, 122, must have a high enough impedance so as not to load down the telephone 118.

In addition to impedance criteria, the various filters must also meet certain performance specifications. For instance, the LPF filters must meet stopband criteria to prevent POTS signaling from causing errors on the ADSL line. POTS signaling which can create errors include ringing signals (20 Hz), broadband ringing transients caused by central unit relays that apply and remove the ringing signal, on-hook/off-hook transients created by a subscriber picking up a handset to make a call, and a ring trip transient caused by a subscriber at a remote telephone answering an incoming call, among others.

In addition to stopband criteria, the LPF filters must also meet passband (200 Hz–4000 Hz) criteria. These passband criteria include insertion loss (at 1000 Hz), passband ripple, return loss (measure of how close the input impedance matches the off-hook load), envelope delay distortion and longitudinal balance, among others.

In telephone networks which have off-hook termination impedances that are purely real (i.e., no imaginary component) the task of meeting both the passband and stopband performance specifications can be achieved by using only passive filters.

However, in telephone networks where such impedances are complex and not purely real, achieving the passband and stopband performance criteria using only passive filters is very difficult. This is because of the wide variety of potential POTS signals which must be handled by the filtering system. This difficulty is shown in the IEEE article written by John Cook and Phil Sheppard, "ADSL and VADSL Splitter Design and Telephony Performance" (IEEE Journal On Selected Areas in Communications, Volume 13, Number 9, December 1995). In this article, an example passive filter is shown. This was an 8th order modified elliptic low pass filter with a cutoff frequency of 42.5KHz. The pole was pushed out to 42.5KHz in order to increase the passband return loss performance to 12 dB at 4KHz. The point of the exercise was to show that having the pole at 42.5 KHz was unacceptable since this collided with the ADSL data bandwidth. In addition, even with the pole at 42.5KHz, the 12 dB return loss number was still unacceptable since the specification is 18 dB minimum.

Due to the difficulty of meeting the criteria with only passive filters, active filters are used to make the complex load look real through the use of impedance converters.

U.S. Pat. No. 5,623,543 to Cook is an example of an active filtering approach used to accommodate the various POTS signals. However, such a design adds complexity, cost, power consumption, and board real estate over the traditional passive design.

U.S. Pat. No. 5,627,501 to Biran et al. is an example of a passive filter approach. This design calls for a pair of low pass filters connected in series between the transmission line and the POTS receiver at the remote unit. One of the two low pass filters is always activated, while the second is selectively activated by a control signal created at the remote unit. The control signal detects the attenuation caused by the transmission line, due to the latter's length, and activates (or deactivates) the second filter accordingly. While this design is able to limit current flow through the lowpass filter to prevent saturation of that filter, it requires monitoring of transmission line loss. More significantly, this design does not take into consideration filter performance in both on-hook and off-hook conditions.

SUMMARY OF THE INVENTION

One objective is to provide an apparatus which achieves the requisite stopband and passband performance specifications under both on-hook and off-hook conditions, in ADSL systems in which the central and remote units have complex impedances.

Another objective of the invention is to provide such an apparatus which has lower cost, reduced power requirements, and takes up less board space, than existing active filtering arrangements.

These and other objectives are realized by a system in accordance with the present invention. Such a system includes a dual-mode filter network which can be operated in a first mode when the POTS unit is on-hook and in a second mode when the POTS unit is off-hook. The filter network can be positioned at either the central unit, between the transmission line and the PSTN, or at the remote unit, between the transmission line and the POTS. In either situation, the filter network is controlled by a control signal reflective of whether the POTS telephone is on-hook or off-hook. The control signal is provided by a detector positioned either at the remote unit or the central unit.

A further aspect of the present invention is a filter network comprising discrete elements. The filter network can be configured in a number of ways. One configuration is a pair of filters connected in series, wherein only one filter is active during a first mode, and both filters are active during a second mode, thereby forming a linear system of cascaded filters. A second configuration is a pair of filters connected in parallel, wherein only one filter is active during a first mode and only the other filter is active during a second mode. A third configuration for the filter network is a hybrid system wherein certain discrete elements are activated or deactivated when one switches from the first mode to the second mode.

A further aspect of the present invention is that when the detector and the filter network are not located at the same unit, the control signal is sent across the transmission line via an overhead channel.

BRIEF DESCRIPTION OF THE DRAWINGS

The present invention can better be understood through the attached figures in which.

DETAILED DESCRIPTION OF THE PREFERRED EMBODIMENT

Aforementioned U.S. Pat. Nos. 5,623,543 and 5,627,510 are incorporated by reference to the extent necessary to understand the present invention.

Figure 1:
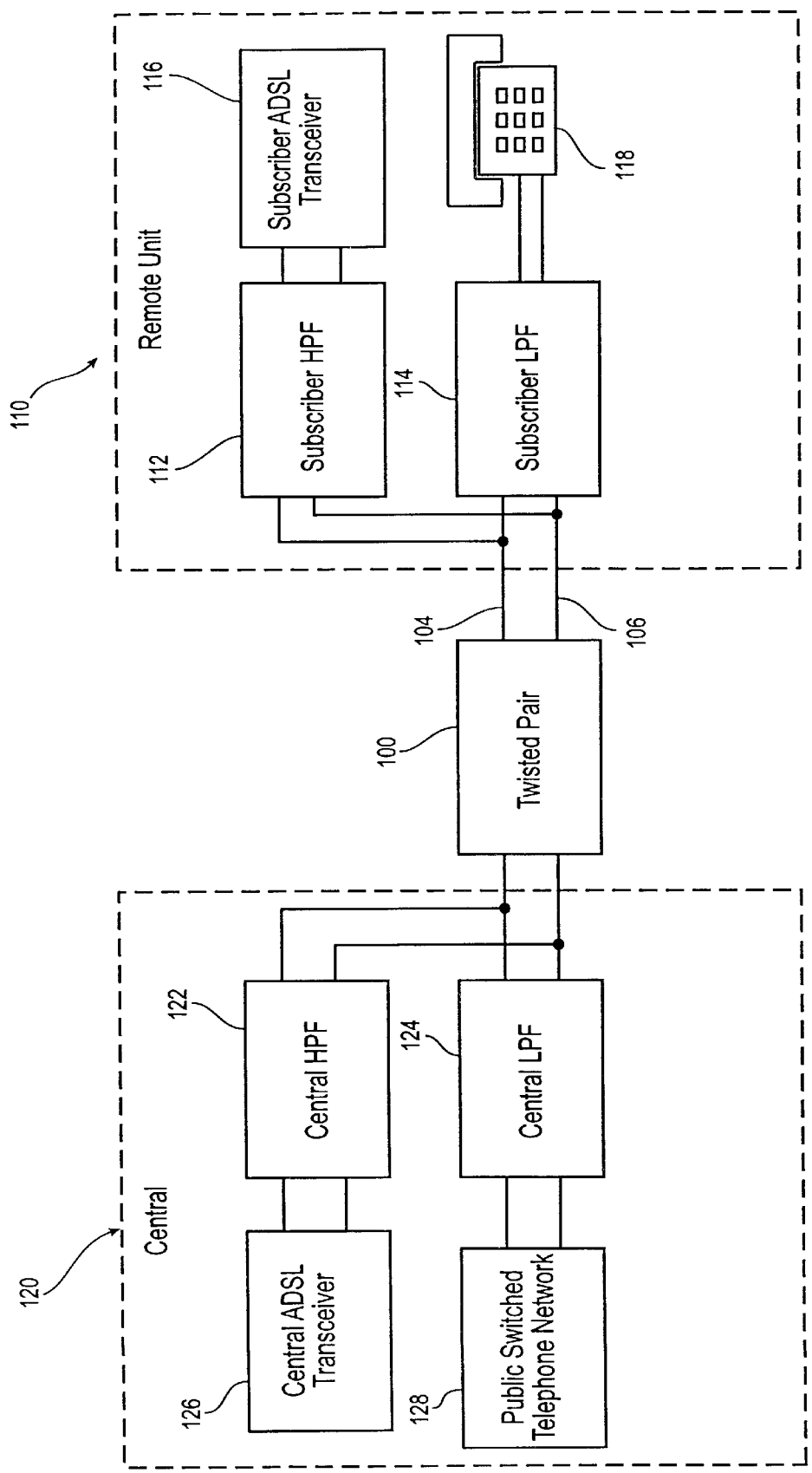
FIG. 1 shows a block diagram of a prior art asymmetric digital subscriber line (ADSL) system.
Figure 2:
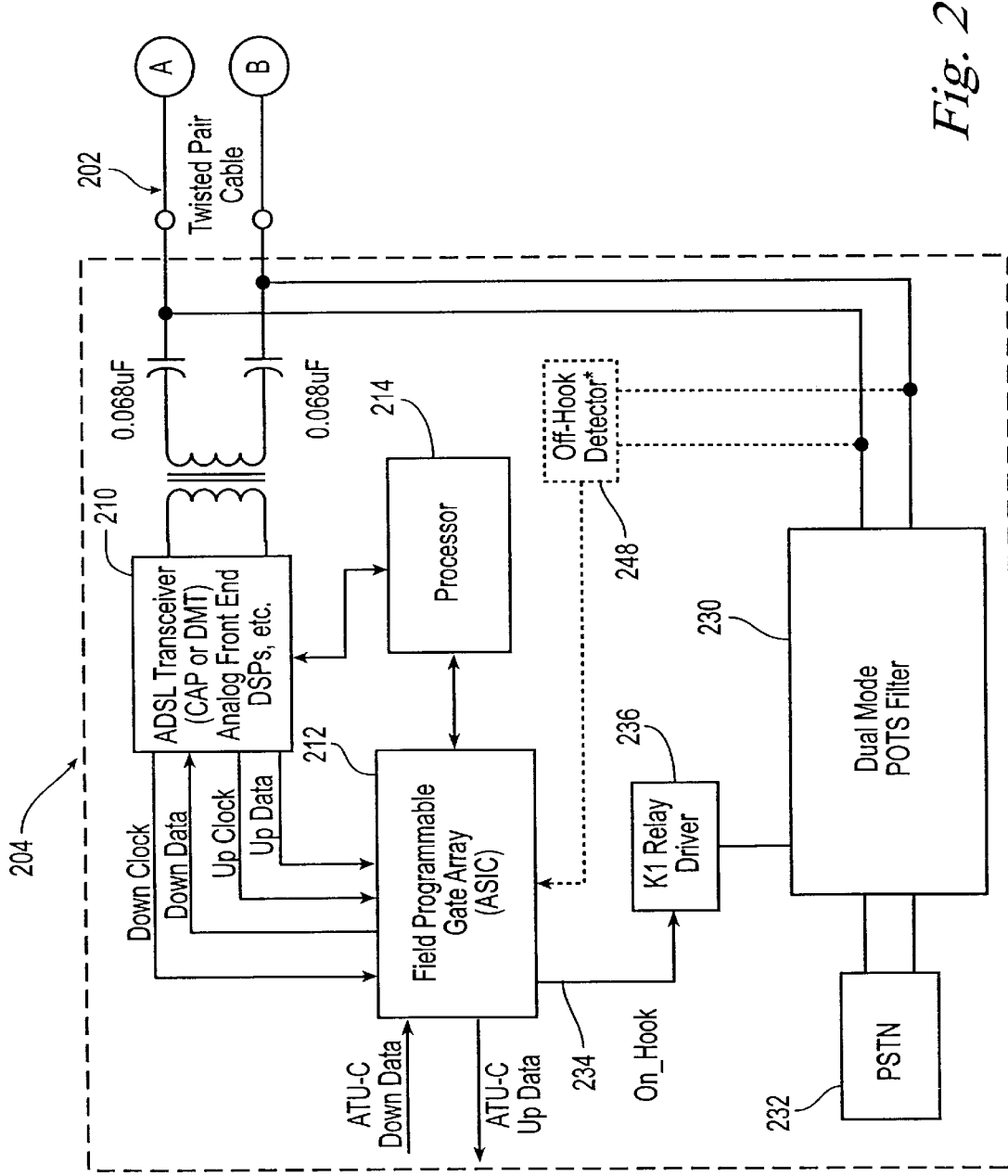
FIG. 2 shows a block diagram of an ADSL system in accordance with the present invention.
Figure 2A:
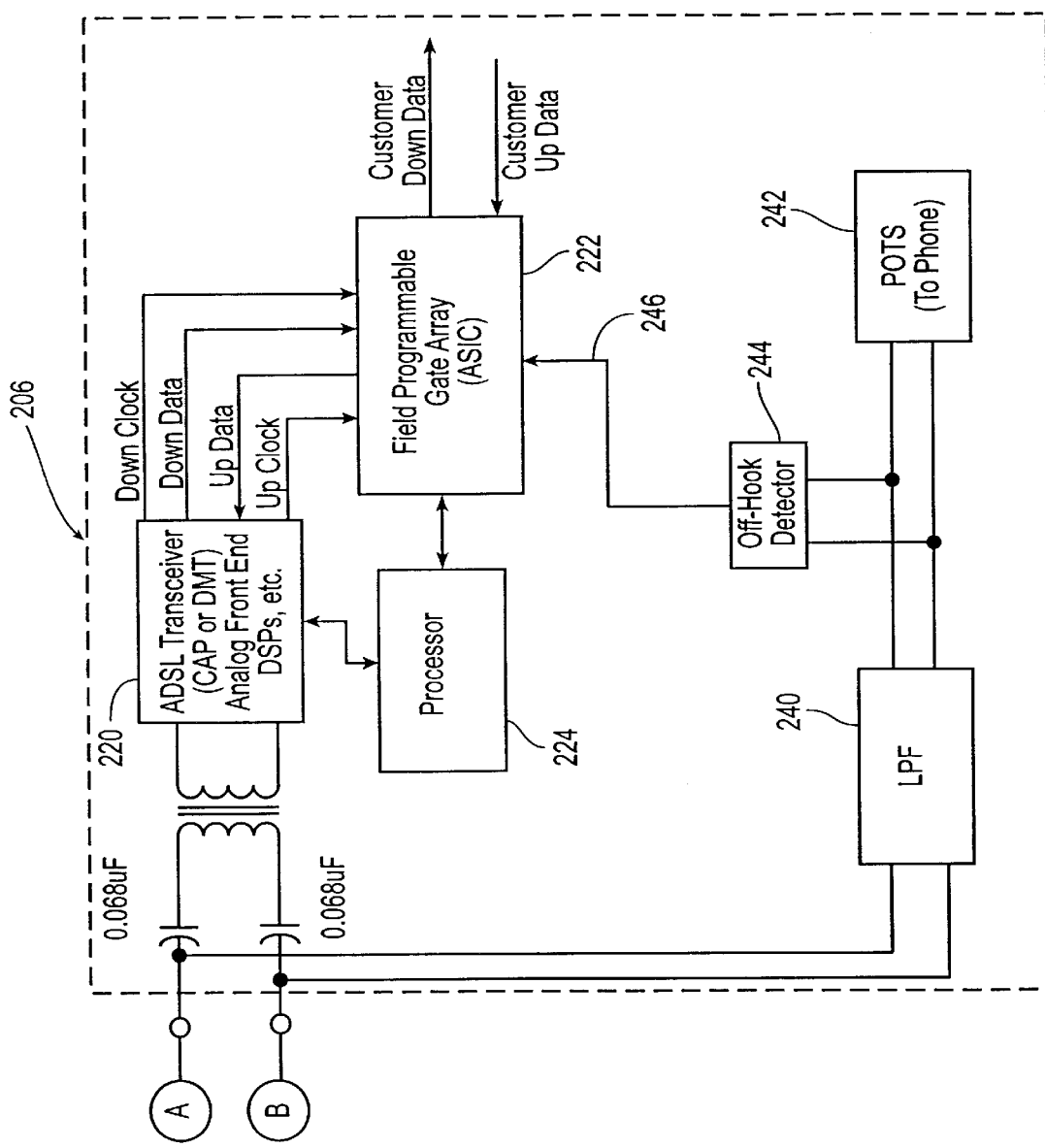

FIG. 2 shows a block diagram of a preferred embodiment of a system in accordance with the present invention. A twisted pair 202 connects a central unit 204 with a remote unit 206. The central unit 204 is provided with an ADSL transceiver 210 which sends and receives data at the central unit 204 via an ASIC-implemented field programmable gate array 212 under the control of a processor 214. Similarly, the remote unit 206 has a corresponding ADSL transceiver 220 which sends and receives data at the remote unit 206 via an ASIC-implemented field programmable gate array 222 under the control of a processor 224.

In the preferred embodiment, ADSL transceivers 210, 220 comprises a standard ADSL chip set of CAP modulation transceivers, such as those available from Globespan; field programmable gate arrays 212, 222 can be implemented as part no. XC4020 available from Xilinx, and processors 214, 224 can be implemented part no. 80C188 from Intel. The configuration described thus far is well known in the prior art.

The present invention further includes a dual-mode filter network 230 located at the central unit. Filter network 230 filters voiceband signals between the twisted pair 202 and the PSTN 232. The filter network 230 filters the voiceband signals in one of two modes, based on a control signal 234 from the gate array 212. The control signal 234 drives a relay 236 which activates connections within the filter network 230, selectively causing the filter network 230 to operate in either a first or a second mode. In the preferred embodiment, the relay 236 is implemented as a standard, continuous contact, double pole double throw relay.

At the remote unit 206, the voiceband signals from the twisted pair 202 pass through a low pass filter 240 before being presented to the POTS phone 242. Low pass filter 240 is a standard filter of the sort commonly used at remote units in the prior art, and is similar to that shown in FIG. 6 of aforementioned U.S. Pat. No. 5,623,543 to Cook.

The control signal 234 is reflective of whether the POTS phone 242 at the remote unit 206 is on-hook or off-hook. Control signal 234 is logic high (+5 V) when the POTS phone 242 is on-hook and is logic low (0 V) when the POTS phone 242 is off-hook. At the remote unit 206, a detector 244 determines whether or not the POTS phone 242 is off-hook or on-hook. The detector 244 monitors the voiceband signals between the remote unit's low pass filter 240 and the POTS phone 242 to make this determination. The detector 244 then outputs a detector signal 246 reflective of whether the POTS phone 242 is off-hook or on-hook. This detector signal is presented to the remote unit's gate array 222 where it is properly formatted and then sent by the remote unit's ADSL transceiver 220 via an overhead channel across the twisted pair. At the central unit 204, the received, formatted signal is converted into the control signal 234 in a known manner.

The preferred embodiment of FIG. 2 shows the filter network to be located at the central unit 204 while the detector 244 is located at the remote unit 206. It should be noted however, that one may gain certain advantages by co-locating these two. For instance, both may be located at the central unit, as shown in phantom by detector 248. Such an alternative arrangement may be advantageous, as it would not require retrofitting of equipment already deployed at remote units, and all invention-related equipment could be added only at the central unit 204. Alternatively, both the filter network and the detector may be located at the remote unit 206. This may be useful in the planning and implementation of future ADSL systems. Finally, if one wished, one could even locate the detector at the central unit and the filter network at the remote unit. Such an arrangement may be useful for diagnosis and control, by the central unit, of the remote unit's POTS performance.

The filter network 230 is designed with reference to the two modes in which the POTS telephone 242 must operate: on-hook and off-hook.

In the off-hook mode, voice traffic must be transmitted and so the passband performance is of importance to ensure clarity. However, the stopband performance is not as critical, because broadband transients based on a ringing signal/ring-trip do not occur in the off-hook mode. Therefore, when in the off-hook mode, the ADSL system of the present invention requires a first set of filter performance specifications. The first set of filter performance specifications is optimized for passband performance and has modest stopband performance sufficient to attenuate dial pulsing and off-hook-to-on-hook transients.

In the on-hook mode, no voice data is being transmitted and the passband performance is not as critical. However, the stopband attenuation performance is important because of the possibility of ringing signal/ring-trip transients. Therefore, when in the on-hook mode, a second set of filter performance specifications are required. This second set of performance specifications is optimized for stopband performance, but has a passband performance which is not as good as in the off-hook mode.

Figure 3A:
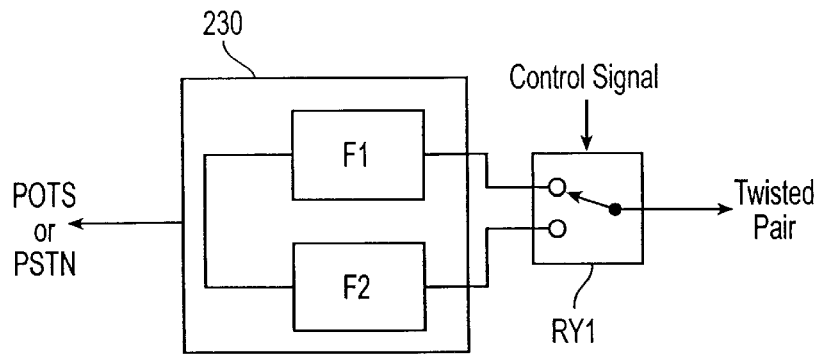
FIGS. 3A–3C show alternate configurations for a filter network to be used in the embodiment of FIG. 2.

FIG. 3A illustrates one embodiment which realizes the first and second sets of filter performance specifications with a filter network in accordance with the present invention. This embodiment provides a filter network comprising two mutually exclusive filters F1 and F2, each filter having an invariant, predetermined frequency response. Only one filter is activated at any given time, under the control of a relay RY1 which receives an input from a control signal. In such case, filters F1 and F2 are connected in parallel and each filter has a port selectively connected to the transmission line while the other port of each filter is connected to either the PSTN (if the filters are at the central unit) or to the POTS (if the filters are at the remote unit).

Figure 3B:
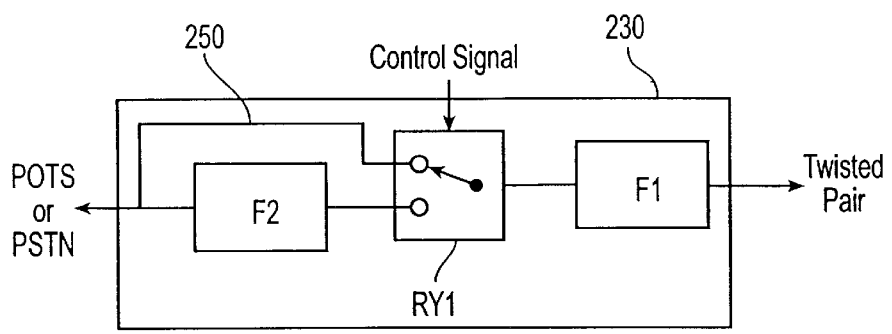

FIG. 3B illustrates another embodiment which realizes to realizing the first and second sets of filter performance specifications. This embodiment provides a filter network comprising two filters F1 and F2 connected in series. Filter F1 has a port connected to the transmission line and filter F2 has a port connected to either the POTS or PSTN. When the filter network is operating in the first mode, only filter F1 is active, and when it is operating in the second mode, both filter F1 and filter F2 are active. A relay RY1 is used to selectively send the signals through filter F2 or through a bypass 250.

Figure 3C:
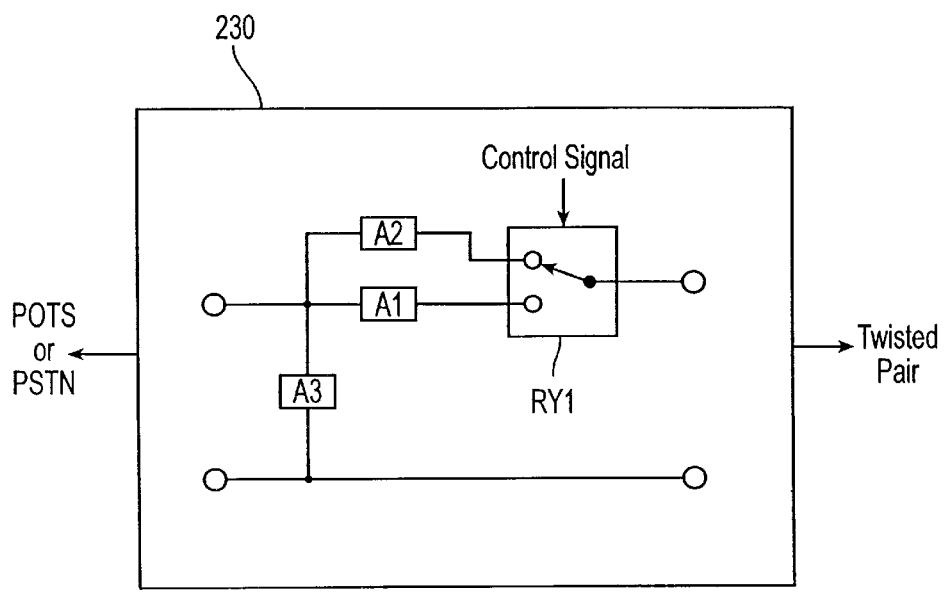

FIG. 3C presents yet another embodiment which realizes the first and second sets of filter performance specifications. The basic concept is that certain discrete elements are active in both modes of operation ("unaffected discrete elements") while other discrete elements are selectively activated or deactivated, depending on the mode of operation ("affected discrete elements"). The affected discrete elements may be selectively connected or disconnected to the unaffected discrete elements in series, or in parallel, or via a hybrid connection, under the control of a relay or other switch. FIG. 3C shows an example in which affected discrete elements A1, A2 are alternatingly activated by relay RY1, depending upon the mode, while unaffected discrete element A3 remains active, regardless of the mode of operation of the filter network 230. It should be kept in mind that the example of FIG. 3C shows the aforementioned affected and unaffected discrete elements in the context of a more complex filter whose complete characteristics are not shown. It should also be kept in mind that this third approach also contemplates multiple nodes controlled by multiple relays, all in response to a control signal reflective of the on-hook/off-hook state of the POTS phone. This allows one to add, delete and shift the poles of the filter network in a predictable manner.

Figure 4:
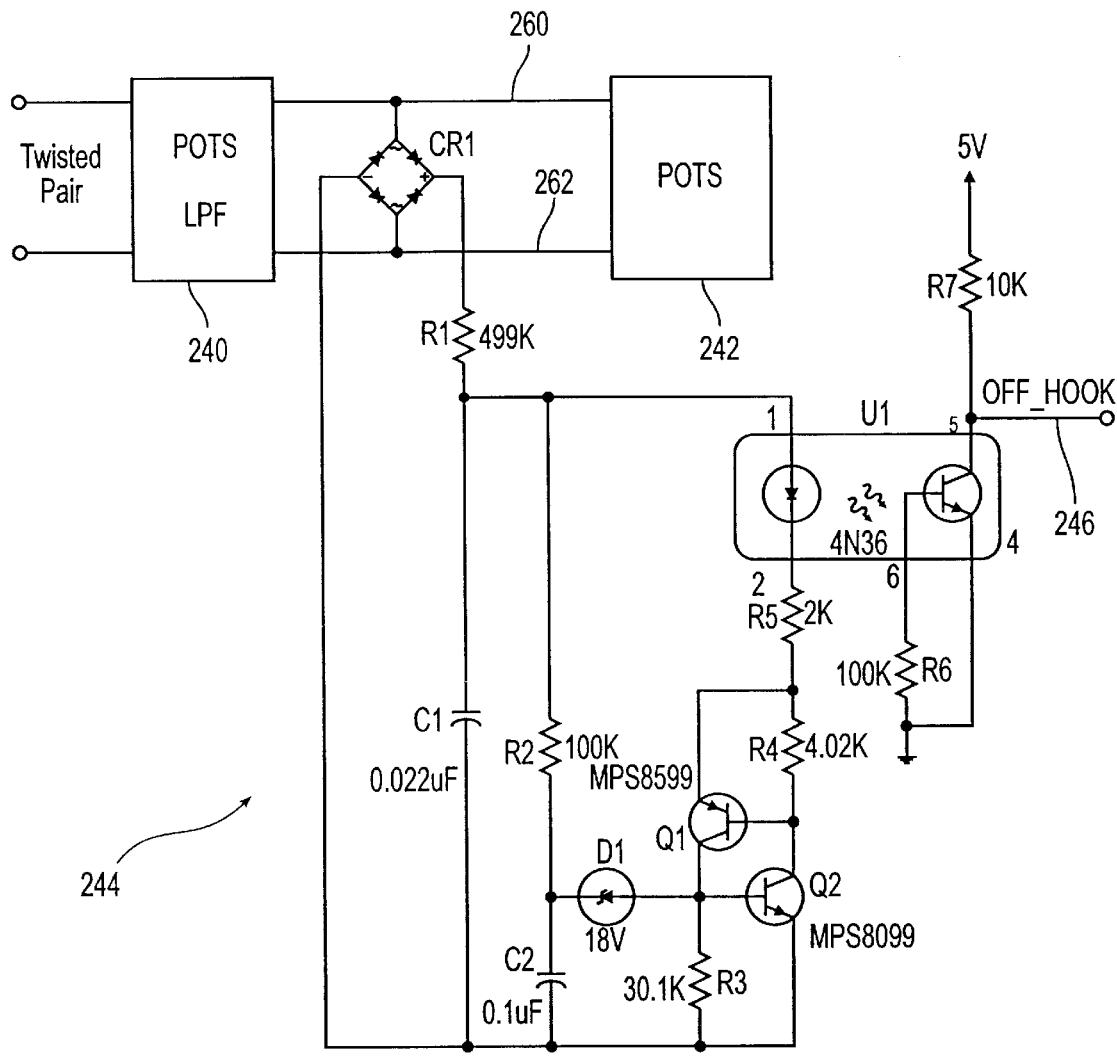
FIG. 4 shows a circuit diagram for a detector used in the present invention.

FIG. 4 shows a circuit diagram of the off-hook detector 242 of FIG. 2. When the POTS phone 242 is in the on-hook state, the voltage across the POTS terminals 260, 262 will approach the office battery voltage of approximately 48 V. In this state, rectifier CR1 will cause capacitor C1 to start charging through resistor R1 and capacitor C2 will charge through resistors R1 and R2. Eventually C2 will charge to a voltage of 18 volts, which is the breakdown voltage of Zener diode D1. At this point, transistors Q1 and Q2, with associated biasing resistors R4 and R3, respectively, turn on, drawing the stored charge in C1. This draws current through resistor R5, turning on the diode portion of U1, which is a 4N46 opto-isolator. This turns on U1's transistor portion which has its sensitivity dampened by resistor R6, and results in a collector-to-emitter current within U1's transistor portion. This current causes a voltage drop across resistor R7, driving the detector signal line 246 low, when in the on-hook mode. When the charge across C1 is depleted, the diode portion of U1 turns off, ultimately allowing the detector signal to return to a high state. This process will repeat while the POTS phone 242 is on-hook, thereby creating a pulsed signal on the detector signal line 246.

When the phone is in the off-hook state, the voltage across POTS terminals 260, 262 will never reach 18 volts. Thus, opto-isolator U1 never turns on and the detector signal line 246 remains high and does not pulse.

The off-hook detector 244 has a real impedance of greater than 500 K$\Omega$, and does not require series-connected elements to detect current when the phone is off-hook. Within the detector 244, opto-isolator U1 provides telephone network voltage (TNV) isolation from the non-TNV circuits to which the detector signal line 246 is connected; this is a safety requirement. Also, in this implementation, the SCR formed by Q1 and Q2, and the charge storage provided by C1 enables sufficient current through U1 without loading down the voltage across POTS terminals 260, 262.

In the circuit of FIG. 2, the detector signal is qualified and integrated within logic circuitry at the remote unit. The qualification and integration prevents false switching between the two filter modes due to events such as current interruptions between pulses during dial pulsing, among others. The detector signal is protected by a CRC (cyclical redundancy code) code and then sent from the remote unit, via an overhead channel across the twisted pair. At the central unit, the detector signal is CRC decoded and then qualified to ensure its integrity.

While the detector 244 shown in FIG. 4 is especially designed to be positioned at the remote unit, one of ordinary skill in the art should recognize that such a design may be adapted for use at the central unit, as well, without comprising its desirable attributes of meeting DC resistance specifications without adversely affecting passband performance. Table 1 lists the values for discrete elements used in the detector circuit 244 of FIG. 4.

TABLE 1

Component Values for Detector Circuit FIG. 4

| COMPONENT | VALUE |
|---|---|
| R1 | 499 KΩ |
| R2 | 100 KΩ |
| R3 | 30.1 KΩ |
| R4 | 4.02 KΩ |
| R5 | 2 KΩ |
| R6 | 100 KΩ |
| R7 | 10 KΩ |
| C1 | 0.22 µF |
| C2 | 0.1 µF |

Figure 5:
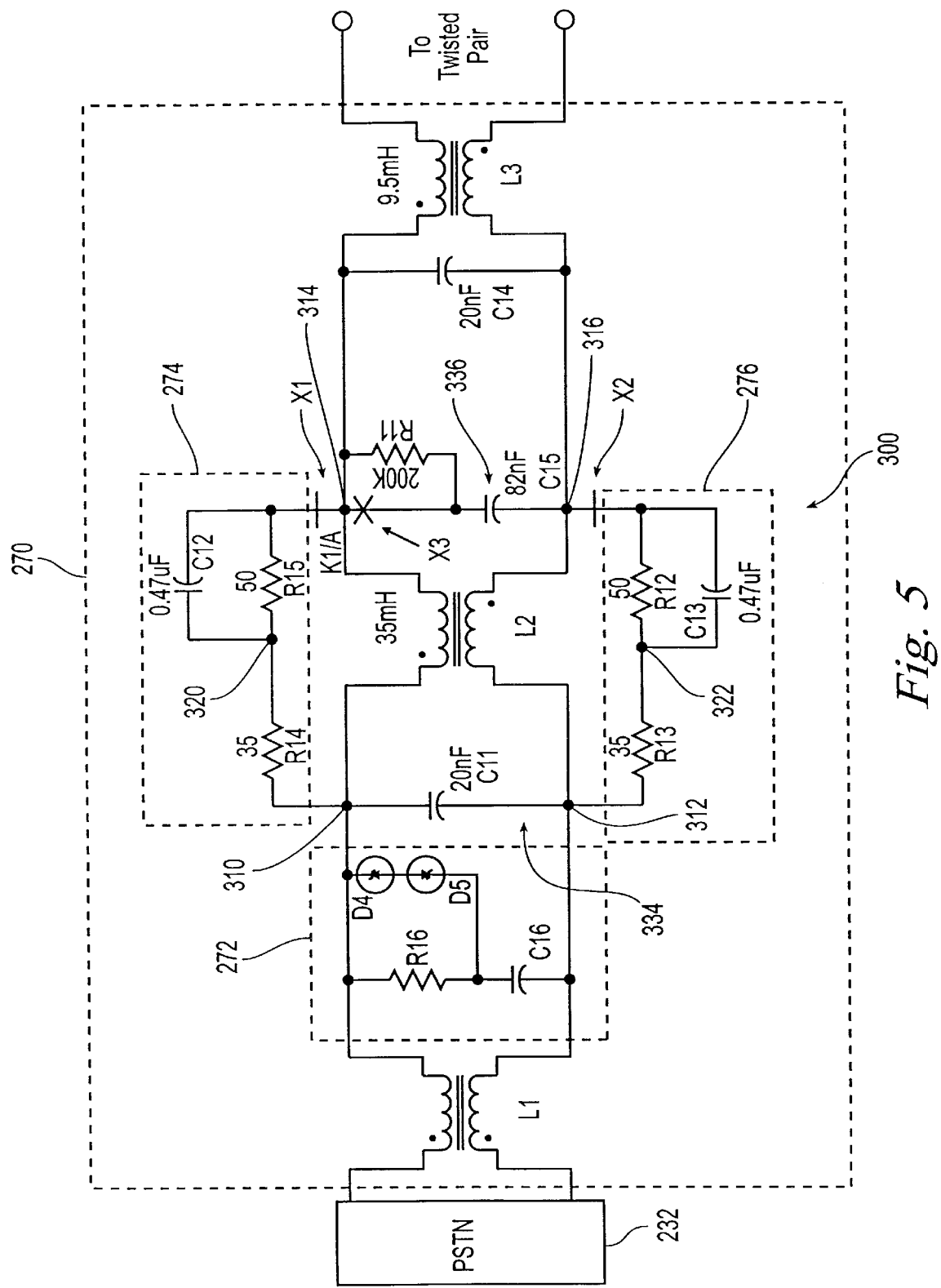
FIG. 5 shows a preferred embodiment of a dual-mode filter network for the circuit of FIG. 2.

FIG. 5 shows a circuit diagram 270 of a preferred embodiment of the filter network 230 of FIG. 2. The circuit diagram 270 is an implementation of the above-described third approach, in which only a small number of discrete elements are affected when the filter network is switched between the first mode and the second mode. In circuit 270, the impact of switching from the first mode to the second mode, or vice versa, is manifested by contacts X1, X2 and X3. It should be understood, however, that contacts X1, X2 and X3 are controlled by a relay, which preferably is a make-before-break type, in order to allow for a smooth, error-free transition between modes. A relay such as TXD-2-2M-5V, available from NEC, is suitable for this purpose.

The circuit 270 comprises inductors L1, L2 and L3. Inductor L1 is a common mode choke which is used to prevent longitudinal signaling transients from causing ADSL data errors. Capacitor C11 and inductor L2 form a first filter stage and capacitor C14 and inductor L3 form a second filter stage. A snubber circuit 272, connected across complementary terminals of inductor L1, suppresses voltage peaks passing through the circuit 270. As shown in circuit 270, snubber circuit 272 is implemented with resistor R16, capacitor C16 and Zener diodes D4 and D5. It should be kept in mind, however, that alternate designs for the snubber circuit may work as well. The discrete elements mentioned thus far, are always active, regardless of the mode of operation of the circuit 270.

When the POTS phone is moved from off-hook to on-hook, the on-hook status is ultimately translated into a control signal which activates relay 236 (See FIG. 2). In this instance, the relay causes contacts X1 and X2 to open and contact X3 to close. In the on-hook mode, the additional pole circuitry 274 and 276 is not activated, resistor R11 is short circuited and capacitors C14 and C15 are in electrical parallel. In such case, C15 and L2 provide extra stopband attenuation to suppress ringing and ringing transient errors on the DSL.

When the POTS phone is moved from on-hook to off-hook, the off-hook status is ultimately translated into a control signal which deactivates relay 236. This time, the relay causes contacts X1 and X2 to close and contact X3 to open. Under such conditions, resistor R11 keeps capacitor C5 charged to the office battery voltage. This allows for an error-free subsequent transition from off-hook to on-hook. With X1 and X2 closed, additional pole circuitry 274, 276 becomes activated. Resistors R12, R13, R14, R15 and capacitors C12 and C13 are used in the off-hook mode to compensate for the complex load characteristics so as to optimize voiceband performance. Thus, in the circuit 270, a number of discrete elements are activated, or deactivated, depending on the mode of operation, while the remainder are used regardless of the mode. Table 2 lists the values for the discrete elements used in the circuit 270 of FIG. 5.

TABLE 2

Component Values for Filter Circuit FIG. 5

| COMPONENT | VALUE |
|---|---|
| L1 | 5–50 mH |
| L2 | 35 mH |
| L3 | 9.5 mH |
| R11 | 200 KΩ |
| R12 | 50 Ω |
| R13 | 35 Ω |
| R14 | 35 Ω |
| R15 | 50 Ω |
| R16 | 50 KΩ |
| C11 | 20 nF |
| C12 | 0.47 µF |
| C13 | 0.47 µF |
| C14 | 20 nF |
| C15 | 82 nF |
| C16 | 100 nF |

Figure 6:
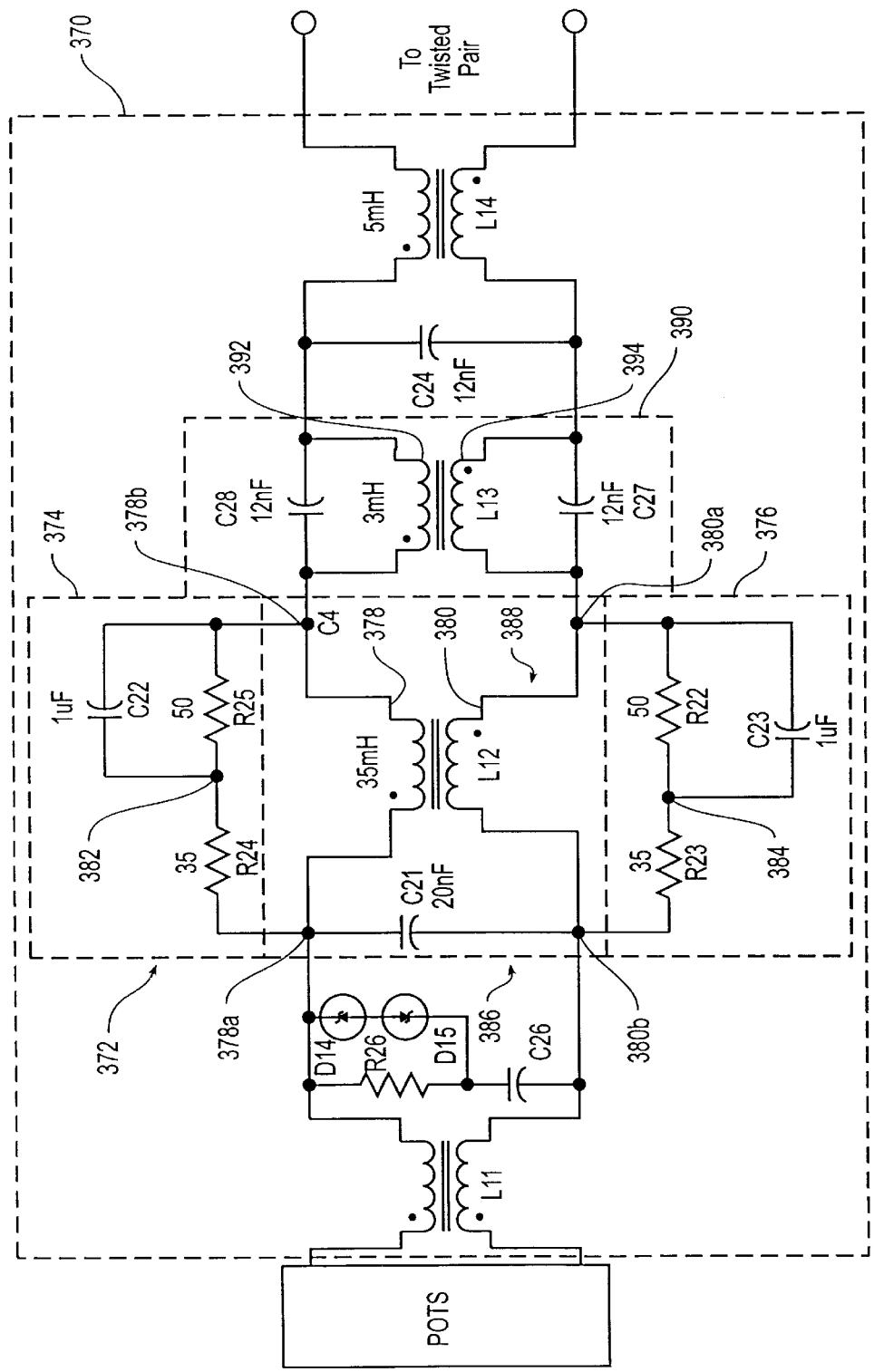
FIG. 6 shows a first preferred embodiment of a single-mode filter network for passband shaping.
Figure 7:
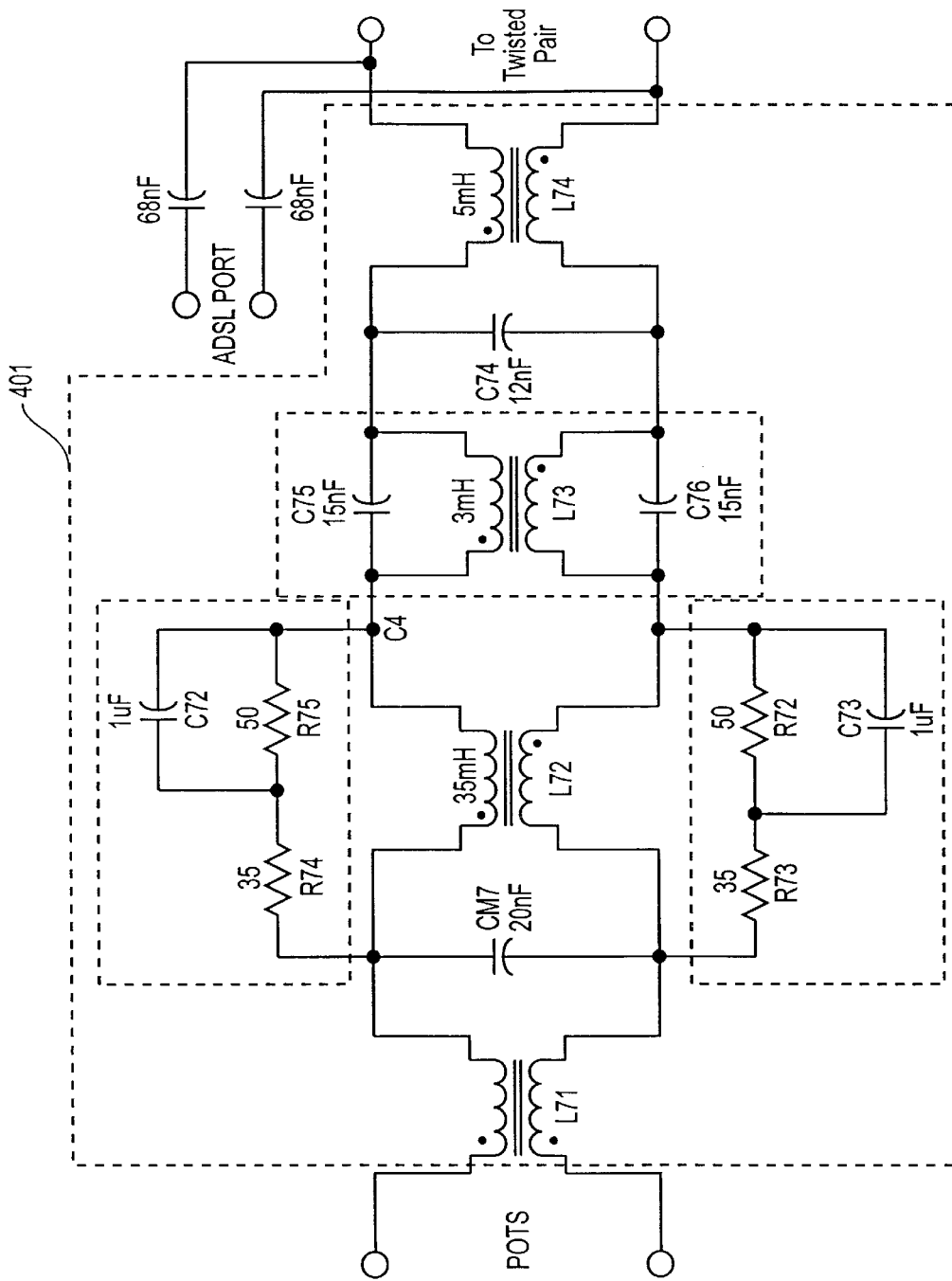
FIG. 7 shows a second preferred embodiment of the single-mode filter network for passband shaping.
Figure 8:
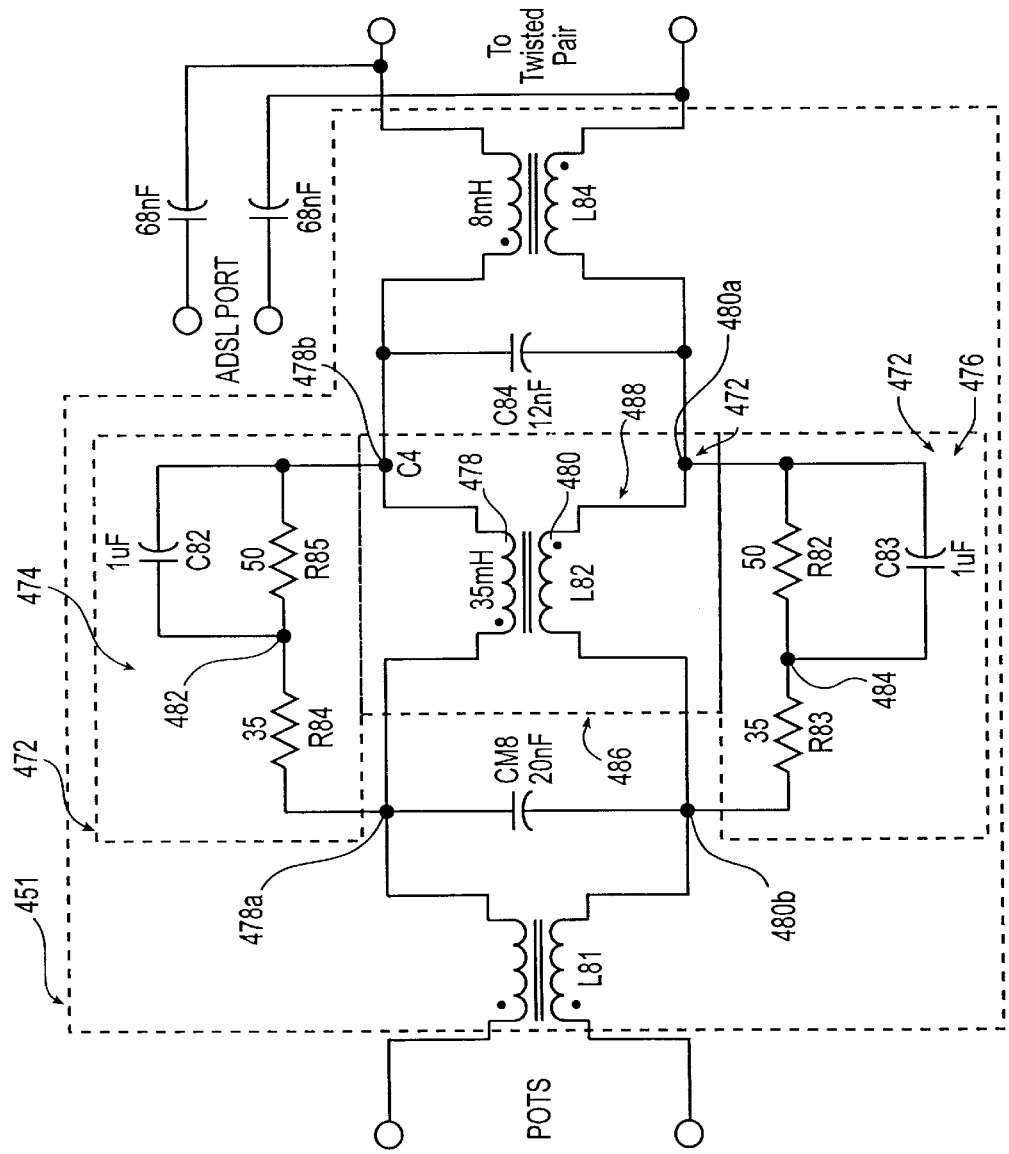
FIG. 8 shows a third preferred embodiment of the single-mode filter network for passband shaping.

FIGS. 6–8 show preferred embodiments of RLC-based single-mode low-pass filter circuits 370, 401, 451, respectively. Any one of the filter circuits 370, 401, 451 can be used to compensate for the complex impedance load, while meeting passband performance requirements not attainable by the passive elliptical filter in the aforementioned IEEE article. More specifically, the filter circuit 370 brings the cutoff frequency down to 15KHz, in addition to raising the passband return loss to above 20 dB at 4KHz. This compares favorably with the 42.5KHz cutoff and 12 dB return loss at 4KHz for the 8th order modified elliptic low pass filter in the IEEE article. Further, the characteristics (i.e., frequency responses, passband return losses and stop band performances) of filter circuits 401, 451 are listed in Tables 3 and 4.

TABLE 3

Frequency Response and Return Loss of the filters depicted in FIGS. 7 and 8

| | | POTS to Twisted Pair | | Twisted Pair to POTS | |
|---|---|---|---|---|---|
| | | FIG. 7 Filter 401 | FIG. 8 Filter 451 | FIG. 7 Filter 401 | FIG. 8 Filter 451 |
| Insertion Loss | 1000 Hz | 1.0 dB | 1.0 dB | 1.0 dB | 1.0 dB |
| Frequency Response ("−" means loss compared to 1000 Hz) | 200 Hz | 0.9 dB | 0.8 dB | 0.8 dB | 0.8 dB |
| | 500 Hz | 0.5 dB | 0.5 dB | 0.5 dB | 0.5 dB |
| | 800 Hz | 0.2 dB | 0.2 dB | 0.2 dB | 0.2 dB |
| | 1000 Hz | 0 (reference) | 0 (reference) | 0 (reference) | 0 (reference) |
| | 1500 Hz | −0.4 dB | −0.4 dB | −0.4 dB | −0.4 dB |
| | 2000 Hz | −0.6 dB | −0.6 dB | −0.6 dB | −0.6 dB |
| | 2500 Hz | −0.8 dB | −0.7 dB | −0.8 dB | −0.7 dB |
| | 3000 Hz | −0.8 dB | −0.7 dB | −0.8 dB | −0.7 dB |
| | 3500 Hz | −0.7 dB | −0.7 dB | −0.7 dB | −0.7 dB |
| | 4000 Hz | −0.6 dB | −0.6 dB | −0.6 dB | −0.6 dB |
| Return Loss | 200 Hz | 29 dB | 29 dB | 29 dB | 29 dB |
| | 500 Hz | 24 dB | 24 dB | 24 dB | 24 dB |
| | 800 Hz | 22 dB | 22 dB | 23 dB | 23 dB |
| | 1000 Hz | 22 dB | 22 dB | 23 dB | 23 dB |
| | 1500 Hz | 23 dB | 23 dB | 24 dB | 24 dB |
| | 2000 Hz | 24 dB | 25 dB | 26 dB | 25 dB |
| | 2500 Hz | 25 dB | 26 dB | 25 dB | 24 dB |
| | 3000 Hz | 25 dB | 26 dB | 24 dB | 23 dB |
| | 3500 Hz | 24 dB | 25 dB | 24 dB | 22 dB |
| | 4000 Hz | 22 dB | 24 dB | 23 dB | 21 dB |

TABLE 4

The Downstream Stopband Performance of the Filters depicted in FIGS. 7 and 8
Stopband Performance (POTS to Twisted Pair)

| | Insertion Loss (100 ohm source and term) | |
|---|---|---|
| Frequency | FIG. 7/Filter 401 | FIG. 8/Filter 451 |
| 20 KHz | 12 dB | 16 dB |
| 30 KHz | 26 dB | 24 dB |
| 40 Khz | 68 dB | 59 dB |
| 80 KHz | 37 dB | 34 dB |
| 100 KHz | 39 dB | 37 dB |
| 300 KHz | 57 dB | 57 dB |
| 500 KHz | 67 dB | 68 dB |

Unlike the dual-mode low-pass filter circuit 270 of FIG. 5, the filters 370, 401, 451 do not change based upon the on-hook/off-hook signal. Nevertheless, filters 370, 401, 451 have acceptable passband and stopband performance for an ATU-R ADSL (i.e., remote unit). The stopband performance of this design is in the range of 40 dB–110 dB in the ADSL frequency range. The remote ATU-R ADSL unit's signal recovery bandwidth starts above 200KHz for the downstream data path. The stopband attenuation of these filters at 200KHz is above the required minimum as shown in Tables 3 and 4. This proves to be an acceptable attenuation to suppress errors caused by ring trip transients, dial pulsing, ringing and on/off hook transitions while maintaining excellent passband characteristics. The attenuation at the upstream bandwidth starting at 40KHz is about 40 dB. Since the ATU-R card generates the upstream data, the signal to noise ratio at the ATU-R card is excellent and the signal plus noise (generated by any signalling transients) is attenuated by the cable to the ATU-C. Therefore no upstream errors are generated by the telephony signalling.

At the ATU-C (i.e., central unit), the upstream signal recovery range starts at 40KHz in the case of CAP modulation. However, the filter 370 has an attenuation of about 40 dB at 40KHz. (The filters 401 and 451 have attenuations of about 68 dB and 59 dB at 40KHz, respectively.) Thus, if one of the filters 370, 401 or 451 were applied at the ATU-C, it most likely would not have enough attenuation to suppress upstream data errors during application and removal of the central office ring relay. However, as discussed above, the dual-mode filter 270 of FIG. 5 could be used at the ATU-C, since the on-hook attenuation of this splitter is 100 dB at 40KHz.

Thus, any one of the filters 370, 401, 451 can be used at the remote unit as the low pass filter 240 shown in FIG. 2, while the filter 270 of FIG. 5 can be used at the central unit as the low pass filter 230 of FIG. 2.

Now describing FIG. 6 in detail, there are two main differences between the two low-pass filter circuits 270 of FIG. 5 and 370 of FIG. 6. Unlike dual-mode filter 270, single-mode filter 370 does not require a relay, or equivalent, to selectively activate additional poles. In addition, filter 370 has an auxiliary inductor stage 390 between the passband shaping circuit 372 and the inductor L14 which connects to the twisted pair.

The passband shaping circuit 372 comprises coupled inductor L12 and first and second pole circuits 374, 376, which are implemented as an RC network. Inductor L12 comprises first and second coils 378, 380. First pole circuit 374 is connected in parallel between positive 378a and negative 378b terminals of first coil 378 of inductor L12, while second pole circuit 376 is connected in parallel between positive 380a and negative 380b terminals of second coil 380 of inductor L12.

The first pole circuit 374 comprises resistors R24 and R25 connected in series between terminals 378a, 378b, and a shunt capacitor C22 connected across resistor R25, between negative terminal 378b and a first node 382 defined between R24 and R25. Similarly, the second pole circuit 376 comprises resistors R23 and R22 connected in series between terminals 380b, 380a, and a shunt capacitor C23 connected across resistor R22, between positive terminal 380a and a second node 384 defined between R23 and R22.

Viewed from the POTS side, the passband shaping circuit 372 has a first port 386 comprising the positive terminal 378a of L12's first coil 378, and the negative terminal 380b of L12's second coil 380. Viewed from the twisted pair side, the passband shaping circuit 372 has a second port 388 comprising the negative terminal 378b of L12's first coil 378, and the positive terminal 380a of L12's second coil 380.

The auxiliary inductor stage 390 comprises coupled inductor L13 and capacitors C27, C28. Capacitor C27 is connected in parallel between terminals of the first coil 392 of coupled inductor L13, while capacitor C28 is connected in parallel between terminals of the second coil 394 of coupled inductor L13. Capacitors C27 and C28 serve to hasten the transition band between the passband and the stopband.

On the POTS side, the filter circuit 370 also comprises coupled inductor L11 connected to snubber circuitry comprising R26, D14, D15 and C26, not unlike the arrangement seen in FIG. 5. An isolation capacitor C21 is connected between the positive terminal 378a of the first coil 378 of L12 and the negative terminal 380b of the second coil 380 of L12. Table 5 lists the values for the discrete elements used in the circuit 370 of FIG. 6.

TABLE 5

Component Values for Filter Circuit of FIG. 6

| COMPONENT | VALUE |
| --- | --- |
| L11 | 5–50 mH |
| L12 | 35 mH |
| L13 | 3 mH |
| L14 | 5 mH |
| R22 | 50 Ω |
| R23 | 35 Ω |
| R24 | 35 Ω |
| R25 | 50 Ω |
| R26 | 50 KΩ |
| C21 | 20 nf |
| C22 | 1 μF |
| C23 | 1 μF |
| C24 | 12 nF |
| C26 | 100 nF |
| C27 | 12 nF |
| C28 | 12 nF |

With respect to FIG. 7, the filter 401 functions substantially identical to the filter 370 of FIG. 6. Further, the filter circuit 401 includes discrete components having substantially identical values as the corresponding values of the discrete components depicted in the circuit 370 of FIG. 6. One obvious difference between filter 401 of FIG. 7 and filter 370 of FIG. 6 is that filter 401 does not include a snubber circuit. The snubber circuit is not included in order to reduce the overall size and manufacturing cost of the filter 401. Table 6 lists the values for the discrete elements used in the filter circuit 401 of FIG. 7.

TABLE 4

Componenet Values for Filter Circuit of FIG. 7

| COMPONENT | VALUE |
| --- | --- |
| L71 | 2.5–50 mH |
| L72 | 35 mH |
| L73 | 3 mH |
| L74 | 5 mH |
| R72 | 50 Ω |
| R73 | 35 Ω |
| R74 | 35 Ω |
| R75 | 50 Ω |
| CM7 | 20 nF |
| C72 | 1 μF |
| C73 | 1 μF |
| C74 | 12 nF |
| C75 | 15 nF |
| C76 | 15 nF |

Now discussing FIG. 8 in detail, the filter 451 includes a passband shaping circuit 472 that comprises coupled inductor L82 and first and second pole circuits 474, 476. The pole circuits 474, 480 are implemented as RC networks. Inductor L82 comprises first and second coils 478, 480. First pole circuit 474 is connected in parallel between positive 478a and negative 478b terminals of first coil 478 of inductor L82, while second pole circuit 476 is connected in parallel between positive 480a negative 480b terminals of second coil 480 of inductor L82.

The first pole circuit 474 comprises resistors R84 and R85 connected in series between terminals 478a, 478b, and a shunt capacitor C82 connected across resistor R85, between negative terminal 478b and a first node 482 defined between R84 and R85. Similarly, the second pole circuit 476 comprises resistors R83 and R82 connected in series between terminals 480b, 480a, and a shunt capacitor C83 connected across resistor R82, between positive terminal 480a and a second node 484 defined between R83 and R82.

Viewed from the POTS side, the passband shaping circuit 472 has a first port 486 comprising the positive terminal 478a of L82's first coil 478, and the negative terminal 480b of L82's second coil 480. Viewed from the twisted pair side, the passband shaping circuit 472 has a second port 488 comprising the negative terminal 478b of L82's first coil 478, and the positive terminal 480a of L82's second coil 480. As it has been shown, the above described passband shaping circuit 472 is substantially similar to the passband shaping circuit 372 of FIG. 6.

On the twisted pair side, the filter 451 includes a capacitor C84 connected between the negative terminal 478b of the first coil 478 of L82 and the positive terminal 480a of second coil 480 of L82. The filter 451 then includes a coupled inductor L84 having first and second coils. One end of the first coil is connected to the negative terminal 478b of the first coil 478 of L82, while one end of the second coil is connected to the positive terminal 480a of second coil 480 of L82. The inductor L84 acts as an open circuit viewed from the twisted pair side.

On the first port 486 side, an isolation capacitor CM8 is connected between the positive terminal 478a of the first coil 478 of L82 and the negative terminal 480b of the second coil 480 of L82. In addition, a common mode choke inductor L81 is connected to the first port 486 side of the pass band shaping circuit 472. As a common mode choke inductor, the inductor L81 can also be located between the capacitor C84 and the inductor L84 or between the inductor L84 and the twisted pair. It is understood that the common choke inductors of FIGS. 5–7 may also be repositioned in a similar manner.

The filter 451 does not include an auxiliary inductor stage between its passband shaping circuit 472 and the inductor L84 which connects to the twisted pair. By not including an auxiliary inductor stage, the overall size and manufacturing cost of the filter 451 are reduced without harming performance characteristics thereof. It should also be noted that the filter circuit 451 may also comprise snubber circuitry not unlike the arrangement shown in FIG. 5. The snubber circuitry is not included in the filter 451 of FIG. 8, again, in order to reduce the overall size and manufacturing cost of the filter 451. Table 7 lists the values for the discrete elements used in the filter circuit 451 of FIG. 8.

TABLE 7

Componenet Values for Filter Circuit of FIG. 8

| COMPONENT | VALUE |
| --- | --- |
| L81 | 2.5–50 mH |
| L82 | 35 mH |
| L84 | 8 mH |
| R82 | 50 Ω |
| R83 | 35 Ω |
| R84 | 35 Ω |
| R85 | 50 Ω |
| CM8 | 20 nF |
| C82 | 1 μF |
| C83 | 1 μF |
| C84 | 12 nF |

While the above invention has been described with reference to certain preferred embodiments, it should be kept in mind that the scope of the present invention is not limited to these. For instance, the discrete elements listed in Tables 1–2 and 5–7 have 1–5% part tolerances. Further, the values of the discrete elements can vary up to 20% from the listed values and still meet the filter characteristics described above. One skilled in the art may find variations of these preferred embodiments which, nevertheless, fall within the spirit of the present invention, whose scope is defined by the claims set forth below.

What is claimed is:

1. A filter comprising:
    a first inductor having first and second coils, each of said coils having a first and a second terminal;
    first and second resistors connected in series between the first and second terminals of said first coil;
    a first capacitor connected in parallel with the first resistor, said first capacitor connected between one of the terminals of said first coil and a first node defined between said first and second resistors;
    third and fourth resistors connected in series between the first and second terminals of said second coil;
    a second capacitor connected in parallel with the third resistor, said second capacitor connected between one of the terminals of said second coil and a second node defined between said third and fourth resistors, wherein said first terminals of said first and second coils define a first port of said filter, and said second terminals of said first and second coils define a second port of said filter; and
    a third capacitor connected in parallel with said first port.

2. The filter of claim 1, wherein the first and third resistors have substantially identical resistance, the second and fourth resistors have substantially identical resistance, and the first and second capacitors have substantially identical capacitance.

3. The filter of claim 1, further comprising
    a fourth capacitor connected in parallel with said second port.

4. The filter of claim 1, further comprising a second inductor having a second pair of coils, each of said second pair of coils being connected to a different terminal of said second port.

5. The filter of claim 4, further comprising a third inductor having a third pair of coils, each of said second pair of coils being connected to a different terminal of said first port.

6. The filter of claim 5, further comprising
    a fourth capacitor connected in parallel with said second port.

7. An asymmetric digital subscriber line (ADSL) system connecting a public switched telephone network (PSTN) to a plain old telephone system (POTS) switchable between an on-hook mode and an off-hook mode, said ADSL system comprising:
    a central unit comprising a first filter having a first connection to said PSTN;
    a remote unit comprising a second filter having a first connection to said POTS; and
    a transmission line connecting said first and second filters, wherein
    said second filter comprises:
        a first inductor having first and second coils, each of said coils having a first and a second terminal;
        first and second resistors connected in series between the first and second terminals of said first coil,
        a first capacitor connected in parallel with the first resistor, said first capacitor connected between one of the terminals of said first coil and a first node defined between said first and second resistors;
        third and fourth resistors connected in series between the first and second terminals of said second coil;
        a second capacitor connected in parallel with the third resistor, said second capacitor connected between one of the terminals of said second coil and a second node defined between said third and fourth resistors, wherein said first terminals of said first and second coils define a first port of said second filter, and said second terminals of said first and second coils define a second port of said second filter; and
        a third capacitor connected in parallel with said first port.

8. The system of claim 7, wherein the first and third resistors of the second filter have substantially identical resistance, the second and fourth resistors have substantially identical resistance, and the first and second capacitors have substantially capacitance.

9. The system of claim 7, wherein the second filter further comprises:
    a fourth capacitor connected in parallel with said second port.

10. The system of claim 7, wherein the second filter further comprises
    a second inductor having a second pair of coils, each of said second pair of coils being connected to a different terminal of said second port.

11. The system of claim 10, wherein the second filter further comprises a third inductor having a third pair of coils, each of said third pair of coils being connected to a different terminal of said first port.

12. The filter of claim 11, further comprising
    a fourth capacitor connected in parallel with said second port.

13. The system of claim 7, further comprising
    a detector arranged to output a first signal reflective of whether said POTS is on-hook or off-hook,
    wherein said first filter is arranged to operate in a first mode when said first signal indicates that said POTS is on-hook and in a second mode when said first signal indicates that said POTS is off-hook.

14. A filter comprising:
    a first inductor having first and second coils, each of said coils having a first and a second terminal;
    a first Resistor-Capacitor (RC) network connected in parallel with said first coil and being connected to said first and second terminals of said first coil;
    a second RC network connected in parallel with said second coil and being connected to said first and second terminals of said second coil, said first and second RC networks being substantially identical; and
    a first capacitor connected to the first terminals of first and second coils.

15. The filter of claim 14, further comprising
    a second capacitor connected to the second terminals of the first and second coils.

16. The filter of claim 14, wherein each of said first and second RC networks comprise first and second resistors connected in series between the first and second terminals of a corresponding coil, and a second capacitor connected in parallel with the first resistor between one of said terminals of that coil and a first node defined between the first and second resistors.

17. The filter of claim 14, further comprising
    a second inductor having a second pair of coils, each of said second pair of coils being connected to a different terminal of a first port of said filter, wherein said first terminals of said first and second coils define said first port of said filter.

18. The filter of claim 14, further comprising a second inductor having a second pair of coils, each of said second pair of coils being connected to a different terminal of a second port of said filter, wherein said second terminals of said first and second coils define a second port of said filter.

19. The filter of claim 18, further comprising a third inductor having a third pair of coils, each of said third pair of coils being connected to a different terminal of a first port of said filter, wherein said first terminals of said first and second coils define the first port of said filter.

20. The filter of claim 19, further comprising a second capacitor connected to the second terminals of the first and second coils.

* * * * *